E. L. BARNES.
MACHINE FOR LOADING AND DOUBLE DECKING COTTON BALES IN FREIGHT CARS.
APPLICATION FILED DEC. 24, 1918.

1,316,410.

Patented Sept. 16, 1919.
3 SHEETS—SHEET 1.

WITNESS:

INVENTOR.
E. L. Barnes
BY
ATTORNEYS

E. L. BARNES.
MACHINE FOR LOADING AND DOUBLE DECKING COTTON BALES IN FREIGHT CARS.
APPLICATION FILED DEC. 24, 1918.

1,316,410.

Patented Sept. 16, 1919.

INVENTOR.
E. L. Barnes
BY
Lacy & Lacey,
ATTORNEYS

E. L. BARNES.
MACHINE FOR LOADING AND DOUBLE DECKING COTTON BALES IN FREIGHT CARS.
APPLICATION FILED DEC. 24, 1918.
1,316,410.
Patented Sept. 16, 1919.
3 SHEETS—SHEET 3.
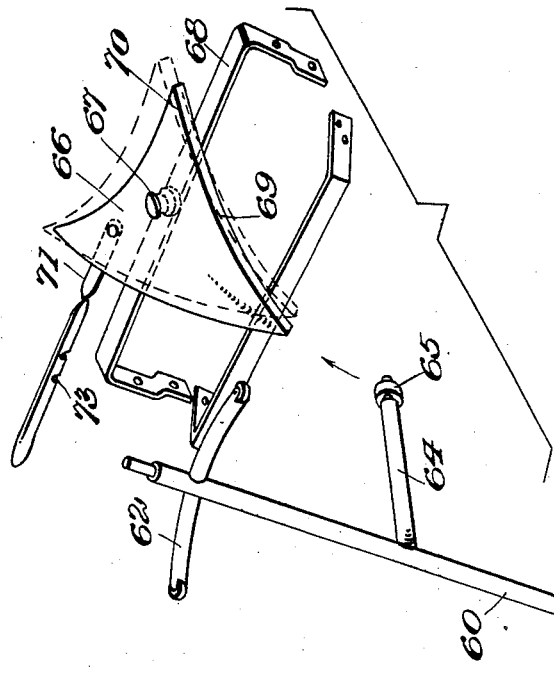
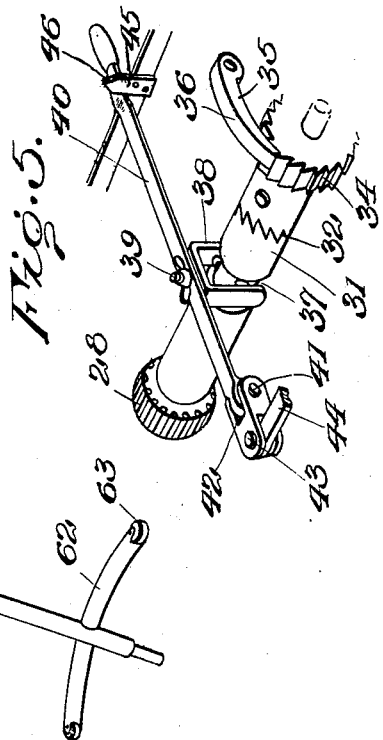
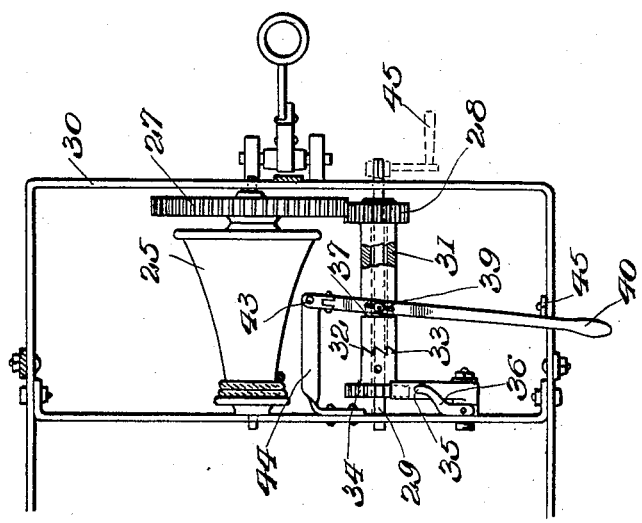
INVENTOR.
E. L. Barnes
BY
ATTORNEYS

UNITED STATES PATENT OFFICE.

ELVIS L. BARNES, OF OKLAHOMA, OKLAHOMA.

MACHINE FOR LOADING AND DOUBLE-DECKING COTTON-BALES IN FREIGHT-CARS.

1,316,410.     Specification of Letters Patent.      Patented Sept. 16, 1919.

Application filed December 24, 1918. Serial No. 268,159.

*To all whom it may concern:*

Be it known that I, ELVIS L. BARNES, a citizen of the United States, residing at Oklahoma, in the county of Oklahoma and State of Oklahoma, have invented certain new and useful Improvements in Machines for Loading and Double-Decking Cotton-Bales in Freight-Cars, of which the following is a specification.

This invention relates to loading apparatus and more particularly to a machine for loading and double decking bales of cotton in freight cars and the like.

In order to economize space in the shipment of baled cotton and reduce liability of fire in transit, the railway regulations require that bales of cotton when loaded in a freight car for transportation be placed one upon the other or "double decked" and as the ordinary bale of cotton is very heavy and unwieldy to handle considerable time and labor is lost in elevating said bales and properly positioning the same within the car. Moreover, owing to the height of the average bale of cotton it must be presented end up to the door opening in the car in order to pass therethrough and the bale must subsequently be turned on its side and in such position elevated on to the top of the lower row or deck of bales within the car.

The present method of manually elevating bales of cotton in freight cars to double deck the same in compliance with the railway regulations is not only slow and entails the employment of extra laborers to effect the loading operation but owing to the exertion incident to lifting the bales of cotton the laborers soon become physically exhausted and a new crew must be put to work.

Recognizing the difficulties attendant upon the present method of loading bales of cotton, the primary object of my invention is to provide a loading machine of simple, durable and inexpensive construction capable of being readily transported from place to place and by means of which bales of cotton may be elevated and double decked in freight cars more expeditiously and with greater facility and less labor than heretofore.

The invention further aims to provide a loading machine which receives a bale of cotton end up, elevates the bale and discharges the same laterally in a horizontal plane on to the tops of the lower row or deck of bales.

The invention further contemplates novel means for elevating the bales and means whereby said bales may be discharged either at the right or at the left of the machine.

A further object is to provide a loading machine including a supporting frame having an elevating member pivotally mounted thereon and actuated either manually or through the medium of a suitable motor to raise the bales to the proper height for lateral discharge, said frame being provided with traction wheels and suitable anchoring spurs so arranged as to bite into the floor and prevent displacement of the machine when the rear traction wheels are lowered.

A still further object of the invention is generally to improve this class of devices so as to increase their utility, durability and efficiency.

Other and incidental objects will appear as the description proceeds. In the drawings wherein I have illustrated the preferred embodiment of the invention, and wherein similar reference characters designate corresponding parts throughout the several views:

Fig. 3 is a top plan view of the winding drum and its associated parts;

Fig. 4 is a perspective view of the bale ejector and actuating plate detached;

Fig. 5 is a detail perspective view of the combined shipper lever and brake detached.

Corresponding and like parts are referred to in the following description and indicated in all the views of the drawings by the same reference characters.

Figure 1:
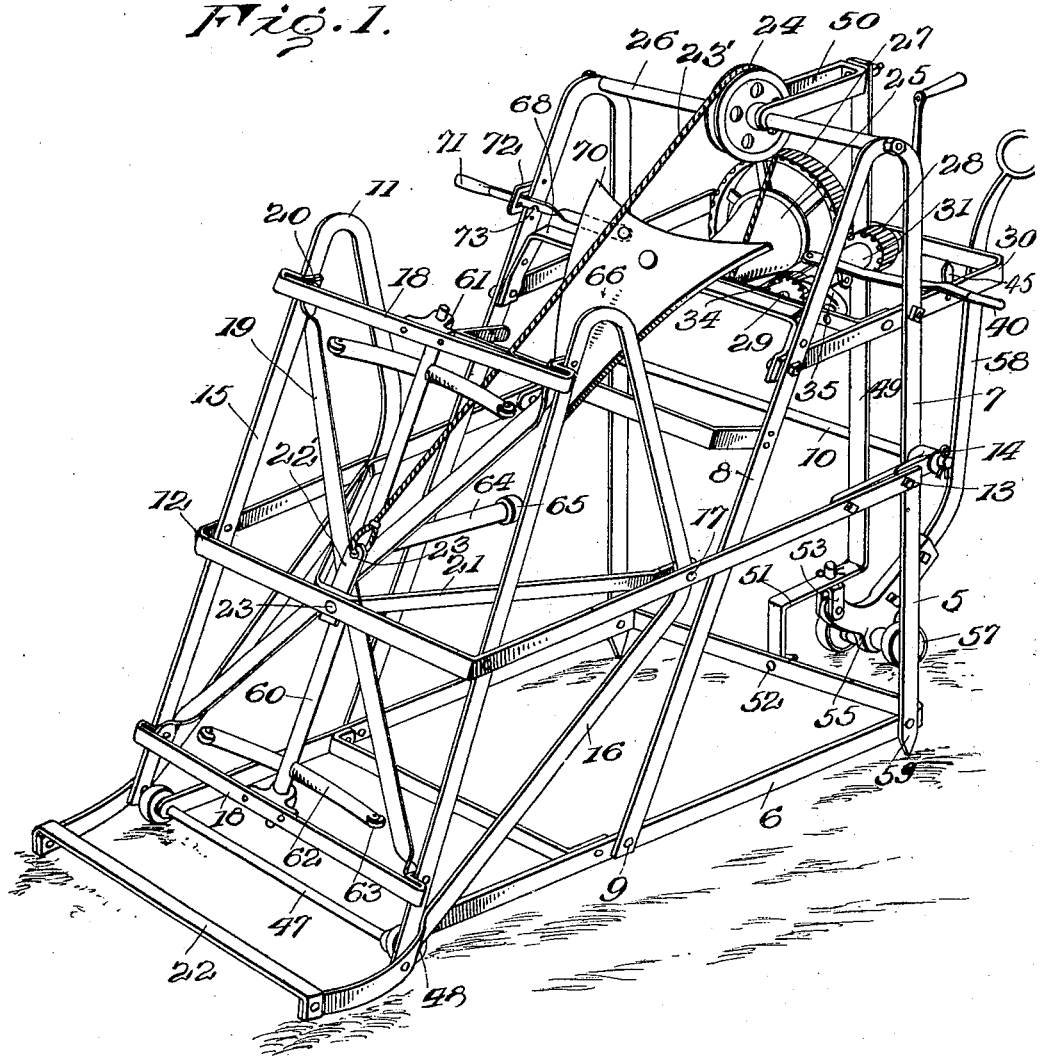
Figure 1 is a perspective view of a cotton bale loading apparatus constructed in accordance with the present invention.

The improved loading mechanism forming the subject-matter of the present invention comprises a main supporting frame, preferably formed of metal and indicated as a whole at 5, said frame comprising a lower horizontal substantially U-shaped member 6 to which are connected upstanding side members, each consisting of a vertical upright bar 7 and a diagonal bar 8, the lower ends of which are bolted or otherwise rigidly secured to the lower member 6 as indicated at 9. Extending transversely through suitable openings in the upright 7 is a rod or shaft 10 on which is pivotally mounted for swinging movement a load support, indicated as a whole at 11. The load support comprises a substantially U-shaped frame 12, the opposite ends of which are bolted or otherwise rigidly secured at 13 to pivot arms 14 mounted on the shaft 10 so as to permit the load support to swing from the full line position shown in Fig. 2 of the drawings to the dotted line position shown in said figure. Rigidly secured to the opposite sides of the frame 12 are side members 15 each preferably formed of a single length of metal bent upon itself to form truss rods 16 which extend rearwardly of the machine and are bolted or otherwise rigidly secured to the frame 12, as indicated at 17. The front of the frame 12 extends transversely across the side members 11 at substantially the center of the load support and arranged above and below the frame 12 and bolted or riveted to the side members 15 are transverse bars 18. The transverse bars 18 in conjunction with the side members 15 and closed end of the frame 12 form in effect a platform or support for the bale of cotton or other object to be elevated. The load support is further reinforced and strengthened by the provision of intersecting diagonal bars 19, the opposite ends of which are secured to the inturned ends 20 of the transverse bars 18 and also to the adjacent side members 15. A substantially V-shaped truss bar or brace 21 also preferably extends from the forward end of the frame 12 to the side bars of said frame and the ends of said truss bar are preferably secured to the side members 11 by means of the rivets or fastening devices 17.

Figure 2:
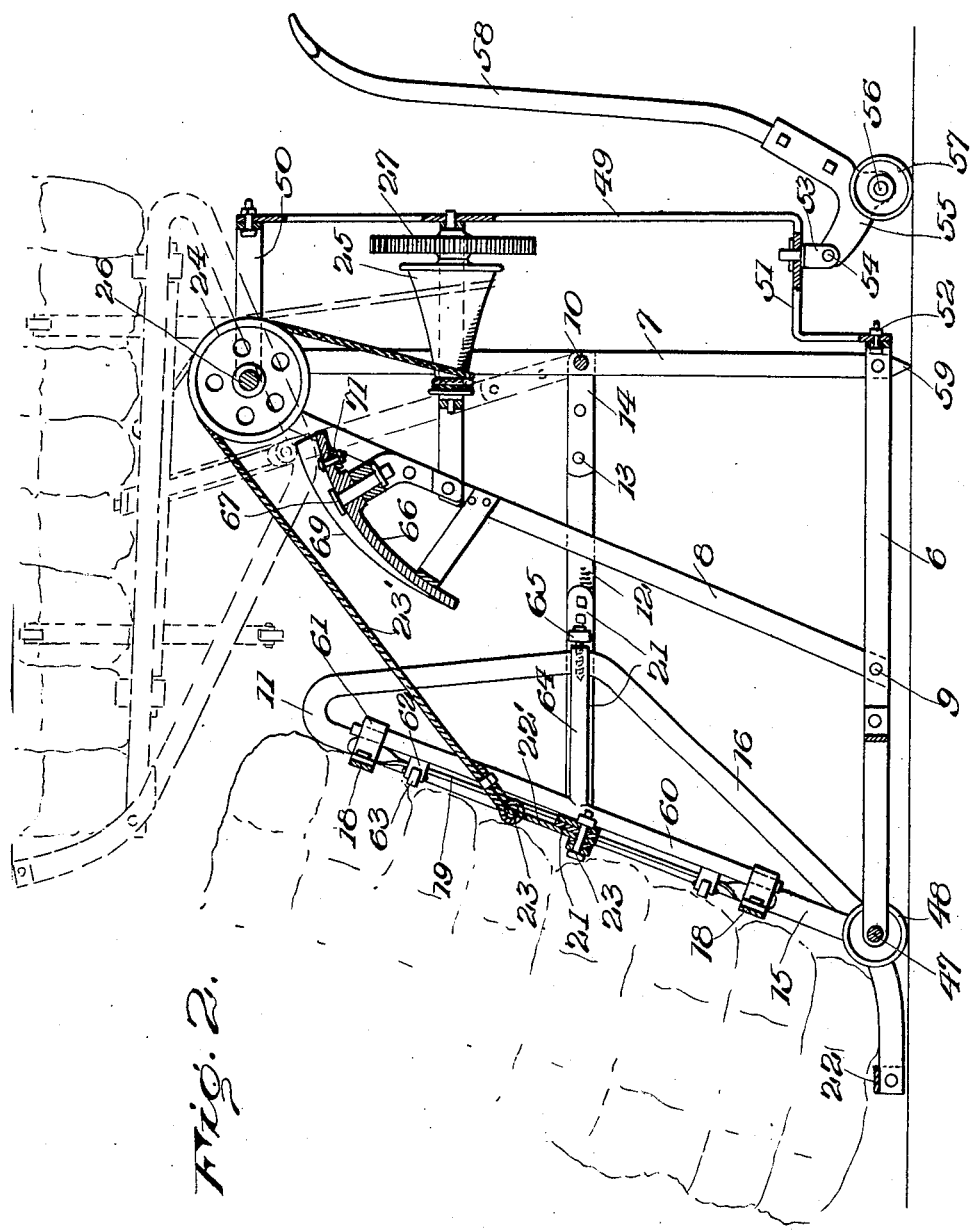
Fig. 2 is a vertical sectional view showing in full lines the load support in lowered position with a bale thereon and in dotted lines said support in elevated position and the bale being ejected or discharged laterally.

The lower ends of the truss rods 16 are preferably extended laterally beyond the front of the machine and connected by a transverse bar 22 to form a supporting ledge or lip upon which the bale of cotton is placed end up and supported, as best shown in Fig. 2 of the drawings. Interposed between the front end of the frame 12 and the diagonal braces 19 is an anchoring plate 22' having an opening 23 formed therein and through which extends one end of an elevating rope or cable 23', the opposite end of which extends over a pulley 24 and is passed around a winding drum 25. The pulley 24 is journaled on a shaft 26 connecting the upper ends of the side members of the main frame, said pulley forming a guide for the cable and serving to direct said cable onto the winding drum during the raising and lowering operation. The drum 25 is preferably tapered or conical in shape and secured to one end of said drum is a gear wheel 27 which meshes with a pinion 28 slidably mounted on a stub shaft 29. Secured to the side members of the main frame is an auxiliary frame 30 in which the winding drum 25 and stub shaft 29 is journaled, said auxiliary frame having its inner end rigidly secured to the side members of the main frame and its outer end projecting longitudinally in a horizontal plane beyond the uprights 7, as shown, so that the winding drum will be supported in a horizontal plane immediately below the sheave or pulley 24. Secured to or formed integral with the pinion 28 is a sleeve 31 having a clutch face 32 which meshes with the corresponding clutch face 33 of a ratchet wheel 34. The ratchet wheel 34 is keyed or otherwise rigidly secured to the stub shaft 29 so as to rotate therewith while the sleeve carrying the pinion 28 is slidably mounted on said stub shaft, the length of the sleeve 31 being such that the pinion 28 is always in mesh with the gear wheel 27. Pivotally mounted on a stud or bolt extending laterally from the auxiliary frame 30 is a pawl 35 adapted to engage the ratchet teeth 34 and prevent rearward rotation of the drum during the elevation of the load support, said pawl being yieldably held in contact with the ratchet teeth by means of a suitable spring 36. The sleeve 31 is provided with an annular groove 37 which receives a fork-shaped member 38 which in turn is pivoted at 39 to an operating lever 40. The inner end of the lever 40 is pivotally mounted at 41 on a clip 42 which in turn is pivoted at 43 to a support 44 carried by the auxiliary frame 30 so as to permit the lever 40 to have a vertical as well as a lateral movement. It will thus be seen that by moving the free end of the lever 40 in one direction the clutch faces 32 and 33 will interengage so that by rotating the hand crank 45, the drum 25 may be rotated to wind the cable 23 thereon and thus elevate the load support. When the free end of the lever is moved in the opposite direction the clutch faces 32 and 33 will be disengaged and by merely pressing downwardly on the free end of the lever 40 sufficient friction will be created between the fork member 38 and sleeve 31 to exert a braking action on the sleeve and thus control the downward movement or descent of the load support. The lever 40 and fork member 38 thus not only serve to move the clutch faces 32 and 33 into and out of engagement with each other but also form a brake to control the downward movement of the load support. Secured to one end of the auxiliary frame 30 is an up-standing plate or lug 45 which contacts with the free end of the lever 40 and serves to hold said lever in position after the sleeve 31 has been adjusted on the stub shaft 29. The upper end of the lug 45 is preferably beveled in opposite directions so that the free end of the lever 40 may be moved either to the right or left of the lug and in which position it will be held by engagement with said lug.

Extending transversely of the forward end of the U-shaped member 6 is an axle 47 on which are journaled suitable wheels or rollers 48 for the purpose of conveniently transporting the machine from place to place. Arranged at the rear of the machine is a vertical bar 49, the upper end of which is spaced from the main frame by spaced arms 50 which latter engage the rod 26 on opposite sides of the pulley 24 and serve to center said pulley on the rod. The lower end of the bar 40 is offset at 51 and thence extended downwardly and bolted or otherwise rigidly secured to the rear end of the member 6, as indicated at 52. Swiveled in the offset portion 51 is a clip 53 in which is pivotally mounted at 54 a casting 55 provided with an axle 56 carrying wheels or rollers 57 which coact with the rollers 48 when moving the machine from place to place. Secured to the casting 56 is a handle 58 so arranged that when the free end thereof is depressed the machine will be supported on the rollers 48 and 57. The lower ends of the uprights 7 are preferably inclined or beveled to form anchoring spurs 59 adapted to bite into the floor or other support and prevent accidental displacement of the machine during the raising and lowering operation. It will thus be seen that by depressing the free end of the handle, the spurs 59 will be elevated above the floor line and the machine supported on the rollers 48 and 57 and that when the free end of the handle 58 is elevated the spurs 59 will bite into the floor and prevent accidental movement of the machine.

In order to discharge the bale at the side of the machine after said bale has been elevated to the desired height on the support, there is provided an ejector comprising a longitudinally disposed rock shaft 60, the opposite ends of which are journaled in suitable bearings 61 carried by the transverse bars 18. Extending laterally from opposite sides of the rock shaft 60 are arms 62 provided with terminal rollers 63 which bear against the bale of cotton and eject or discharge said bale laterally in the manner hereinafter referred to. Extending rearwardly from the rock shaft 60 and preferably disposed at substantially right angles to the arms 62 is a rod 64 having a terminal roller 65 journaled thereon which roller is disposed in the path of movement of a substantially triangular actuating plate, indicated at 66. The plate 66 is pivotally mounted at 67 on a substantially U-shaped bar 68 arranged between the side members of the main supporting frame so that the bar 68 forms, in effect, a part of said main supporting frame. The actuating plate 66 is provided with diverging side faces 69 which are arranged concentric with the shaft 10 so that as the load support is elevated the roller 65 will bear against and travel over one or the other edge 69 of the actuating plate according to the position of said plate. The upper ends or wings 70 of the actuating plate so also preferably bent or deflected laterally, as shown, to accommodate the movement of the load support. Secured to one of the wings 70 of the actuating plate is a lever 71, the free end of which extends through a loop or keeper 72 on one of the side members of the main frame and is provided with a terminal operating handle by moving which the actuating plate 66 may be tilted so as to cause the roller 65 to engage either inclined edge 69 of said actuating plate and discharge the bale of cotton either to the right or to the left side of the machine as desired. The lower face of the lever 71 is provided with spaced notches 73 adapted to receive the keeper 72 so that after the actuating plate has been shifted on its pivotal axis 67 either to the right or left said plate may be locked in such position.

As previously stated, the machine is principally designed for loading and double decking bales of cotton in freight cars and the like and in operation, after the lower row or deck of bales have been positioned within a freight car, the machine is transported on the traction wheels or rollers to a position within the car with the load-supporting frame facing the door opening therein. The bales of cotton on the receiving platform or dock are then transported by the dock laborers on the usual trucks employed for this purpose and deposited on the load-receiving platform in the position shown in full lines in Fig. 2 of the drawings, the clutch faces 32 and 33 being moved in contact with each other. The operator rotates the winding drum by means of the hand crank 45 and in doing so winds the cable on said drum and elevates the support containing the bale of cotton to the position shown in dotted lines in Fig. 2. As the load support is elevated, the roller 65 rides over one or the other of the edges 69 of the actuating plate according to the position of said plate and as the support with the bale thereon approaches the height of its movement the arm 64 will be tilted laterally and, consequently, rock the shaft 60 thereby causing the arms 62 to bear against the bale of cotton and forcibly eject or discharge said bale of cotton onto the tops of the lower deck or row of bales within the freight car and in which position the discharged bale may be readily rolled to the desired place within the car. After the bale has been elevated and discharged, the lever 40 is moved to disengage the clutch faces 32 and 33 when the load support will swing downward by gravity to the lowered position, the movement of the load support being controlled by the operator by merely pressing downwardly on the free end of the lever 40 which, as before stated, will effect a braking action on the sleeve 31. By moving the lever 71 longitudinally the actuating plate may be tilted so as to discharge the bales of cotton after being elevated either to the right or to the left of the door opening in the freight car.

It will here be noted that owing to the inclination of the load support when in normal or lowered position it is only necessary for the dock laborer to tilt the truck slightly in order to transfer the bale from the truck to the load supporting platform. It will also be noted that owing to the tapered or conical formation of the winding drum the initial upward movement of the load support will be relatively slow, but as the support approaches a horizontal position the cable will be wound on the large end of the drum and the swinging movement of the load support be materially accelerated. It will, furthermore, be noted that the present machine is so constructed that the bale of cotton is delivered on the load support end up and is discharged laterally onto tops of the lower row or deck of bales in a horizontal plane so that the operation of double decking the bales of cotton within the car is materially facilitated.

While I have shown and described a crank for operating the winding drum it will, of course, be understood that a suitable motor may be employed for this purpose if found desirable or applicable. It will also be understood that the machines may be made in different sizes and shapes and constructed of angle-iron or other suitable material without departing from the spirit of the invention.

Having thus described my invention, what is claimed as new is:

1. A loading apparatus including a supporting frame, a load support mounted for swinging movement on the frame, means for elevating the support, and means automatically acting directly upon the load to discharge said load laterally at a predetermined point in the travel of said support.

2. A loading apparatus including a supporting frame, a load support pivotally mounted on said frame for swinging movement in a vertical plane, means for elevating the support, and means acting directly upon the load for automatically discharging said load laterally at either side of the machine.

3. A loading apparatus including a supporting frame, a load support pivotally mounted for swinging movement on the frame and adapted to receive a bale of cotton end up, means for raising the support to elevate the bale, and means for automatically discharging said bale laterally in a horizontal plane when in elevated position.

4. A loading apparatus including a supporting frame, a load support mounted for swinging movement on the frame, an ejector carried by the load support, means for elevating the load support, and means for actuating the ejector to automatically discharge the load at a predetermined point in the travel of said support.

5. A loading apparatus including a supporting frame, a load support pivotally mounted for swinging movement on the frame, an ejector carried by the load support, and means disposed in the path of movement of the load support for actuating the ejector to discharge the load laterally when in elevated position.

6. A loading apparatus including a supporting frame, a load support mounted for swinging movement on the frame, an ejector carried by the load support, an arm extending laterally from the ejector, an actuating member disposed in the path of movement of the arm for actuating the ejector to discharge the load laterally, and means for changing the position of the actuating member to cause the ejector to discharge the load laterally on either side of the machine.

7. A loading machine comprising a supporting frame, a load support pivotally mounted for swinging movement on the frame, a winding drum, a cable connected with the load support and operatively connected with the winding drum, an ejector, and an actuating device disposed in the path of movement of the load support for operating the ejector to discharge the load laterally.

8. A loading apparatus comprising a supporting frame, a load support pivotally mounted for swinging movement on the frame and provided with a retaining lip, a pulley mounted on the frame, a winding drum arranged beneath the pulley, a cable connected with the load support and extending from said pulley and engaging the winding drum, means for rotating the winding drum to elevate the load support, an ejector carried by the load support, and an actuating member disposed in the path of movement of the load support for operating the ejector to discharge the load laterally as the load support approaches the elevated position.

9. A loading apparatus including a wheeled supporting frame, anchoring spurs depending from the frame, a load support pivotally mounted for swinging movement on the frame, an ejector carried by the load support, an actuating member disposed in the path of movement of the load support for operating the ejector to discharge the load laterally as the load support approaches the limit of its upward movement, means for elevating the load support, a casting swiveled on the rear of the machine and provided with a roller, and a handle secured to the casting and adapted when depressed to elevate the anchoring spurs.

10. A loading apparatus including a supporting frame, a load support mounted for swinging movement on the frame, a rock shaft journaled on the load support and provided with laterally extending arms, an arm extending laterally from the rock shaft, means for elevating the load support, and a substantially V-shaped actuating plate disposed in the path of movement of the arm and adapted to tilt the rock shaft and eject the load laterally.

11. A loading apparatus including a supporting frame, a load support mounted for swinging movement on the frame, an ejector carried by the load support and including a laterally extending arm, a substantially triangular actuating member pivotally mounted on the frame, and a lever connected with the actuating member for moving the same to cause either edge of said member to engage the arm and actuate the ejector to discharge the load on either side of the machine.

12. A loading machine including a supporting frame, a load support mounted for swinging movement on the frame, an ejector carried by the load support, an auxiliary frame, a winding drum journaled in said frame, a cable forming a connection between the load support and drum, a gear wheel secured to the drum, a stub shaft journaled in said auxiliary frame, a ratchet wheel keyed to the stub shaft and provided with a clutch face, a sleeve slidably mounted on the stub shaft and having one end thereof provided with a pinion meshing with the gear wheel and its front end provided with a clutch face for contact with the clutch face of the ratchet wheel, an actuating member disposed in the path of movement of the load support for operating the ejector to discharge the load laterally, and a combined shipper and brake lever mounted for vertical and lateral movement and operatively connected with the sliding sleeve.

13. A loading machine including a supporting frame, a load support pivotally mounted for swinging movement on the frame and including a platform normally disposed at an angle to the vertical axis of the machine, an ejector carried by the platform, means for elevating the load support, and an actuating member secured to the frame and arranged in the path of movement of the load support for operating the ejector to discharge the load in a horizontal plane at the side of the machine.

14. A loading apparatus including a supporting frame, a load support pivotally mounted for swinging movement on the frame and including a platform, intersecting diagonal braces arranged at the rear of the platform, an anchoring plate secured to the platform at the intersection of the diagonal braces, a winding drum, a pulley arranged above the drum, a cable having one end thereof connected with the anchoring plate and its opposite end extended over the pulley and wound around the drum, an ejector mounted on the platform, means for rotating the winding drum to elevate the load support, and an actuating member secured to the frame and disposed in the path of movement of the load support for operating the ejector to discharge the load as the load support is elevated.

15. A loading device including a supporting frame, a load support mounted for swinging movement on the frame and including a platform, a rock shaft extending longitudinally of the platform and provided with laterally extending arms, an arm secured to the rock shaft and extending laterally therefrom, means for elevating the load support, a substantially triangular actuating plate pivotally mounted on the frame and having its opposite side edges deflected laterally, said actuating blade being disposed in the path of movement of the arm on the rock shaft for tilting said rack shaft to eject the load, and means operatively connected with the actuating plate for changing the position thereof so as to present either inclined edge of said plate to the arm on the rock shaft and thereby permit discharge of the load on either side of the machine.

In testimony whereof I affix my signature.

ELVIS L. BARNES. [L. S.]

Copies of this patent may be obtained for five cents each, by addressing the "Commissioner of Patents, Washington, D. C."